United States Patent [19]

Berglund et al.

[11] 4,366,540
[45] Dec. 28, 1982

[54] CYCLE CONTROL FOR A MICROPROCESSOR WITH MULTI-SPEED CONTROL STORES

[75] Inventors: Neil C. Berglund, Kasson; John R. Burchfiel, Jr., Rochester, both of Minn.

[73] Assignee: International Business Machines Corporation, Armonk, N.Y.

[21] Appl. No.: 234,004

[22] Filed: Feb. 12, 1981

Related U.S. Application Data

[63] Continuation of Ser. No. 953,674, Oct. 23, 1978, abandoned.

[51] Int. Cl.³ .............................................. G06F 1/04
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,230,353 | 1/1966 | Greene et al. | 235/92 SH |
| 3,508,207 | 4/1970 | Shigaki . | |
| 3,748,651 | 7/1973 | Mesnik . | |
| 3,760,379 | 9/1973 | Nibby et al. . | |
| 3,858,184 | 12/1974 | DeVries . | |
| 3,939,459 | 2/1976 | Hoopes | 340/347 AD X |
| 3,964,027 | 6/1976 | Dalmasso | 364/200 |
| 4,050,096 | 9/1977 | Bennett et al. | 364/200 |
| 4,058,851 | 11/1977 | Scheuneman | 364/200 |
| 4,084,154 | 4/1978 | Panigrahi . | |
| 4,153,941 | 5/1979 | Caddell | 364/900 |

OTHER PUBLICATIONS

Gellender, Learn Microprocessor Fundamentals, Electronic Design 21, Oct. 11, 1977, pp. 74–79.
Powers, Dual Speed Microprocessor, Xerox Disclosure Journal, Nov./Dec., 1977, vol. 2, No. 6, p. 95.
Pitkowsky et al., Data Processing System Clock Control, IBM Technical Disclosure Bulletin, vol. 7, No. 9, 2/1965, pp. 754–755.
Brooks, Extendable Control Store, IBM Technical Disclosure Bulletin, vol. 19, No. 3, 8/76, pp. 1062–1063.
Frankenberg, Designer's Guide To: Semiconductor Memories—Part 7, Electrical Design News, vol. 20, 11/1975, pp.59–70.

*Primary Examiner*—T. J. Sloyan
*Attorney, Agent, or Firm*—Donald F. Voss

[57] ABSTRACT

A system for controlling the cycle time of a central processing unit having associated control store memory units for the storage of information is provided. The system includes a plurality of control store memory locations disposed within the control store memory units for the storage of information. A plurality of control store memory locations are operable at varying speeds and are accessible by the central processing unit. Circuitry is provided for addressing one of the plurality of control store memory locations responsive to address information contained within the information stored within the plurality of control store memory locations. The addressed information selects the next successive control store memory location to be addressed by a central processing unit. The system further includes logic circuitry for dynamically controlling the cycle time of the central processing unit in response to the addressed information and the speed of the location of the next successive one of the plurality of control store memory locations to be accessed by the central processing unit where the cycle time of the central processing unit automatically adjusts to the speed of the next successive addressed control store memory location.

7 Claims, 6 Drawing Figures

CYCLE CONTROL FOR A MICROPROCESSOR WITH MULTI-SPEED CONTROL STORES

This is a continuation of application Ser. No. 953,674 filed Oct. 23, 1978, abandoned.

DESCRIPTION

1. Technical Field

This invention relates to computer systems, and more particularly relates to a control circuit for dynamically adjusting the cycle time of a microprocessor to adjust the microprocessor cycle time to the speed of a control store being accessed.

2. Background Art

User instruction sets, also termed machine language, of computing systems can be implemented by hardware of interpreted by being executed by a series of microinstructions which run on a microprocessor. Where microprocessors are utilized in lieu of hardware, a major problem that confronts development engineers and programmers is the selection of a high speed control store for use with the microprocessors. This problem involves the design of a control store which is within practical size and cost limitations.

One previous technique for minimizing this design problem involves a transient overlay scheme. In this method, a portion of the microprogram is resident in a control store and a portion is held in a main store. The portion of the microprogram held in the main store is brought into a control store as needed. This technique allows the installed control store to be smaller than a store required to hold the entire microcode package for the computer system. A disadvantage to this approach is that the main store operates considerably slower than the control store and therefore a significant amount of time is required to retrieve the nonresident microcode.

Another prior approach involves the use of a control store having sufficient storage locations to store the entire microcode package. Cost limitations of this approach results in an impractical slow operating control store. Additionally, slower memory arrays are typically dynamic and therefore require periodic refresh cycles to maintain their contents. The refresh requirement necessitates that microprocessor operations be temporarily suspended while the control store refreshes.

A need has thus arisen for a computer system control store control system for overcoming the above-discussed design problems. Such a control system must be operable with varying speeds of both fast and slow control stores. Such a system must further be compatible with refresh circuitry and a microprocessor to dynamically adjust the cycle of the microprocessor to the speed of the control store being accessed. Additionally, a need has arisen for a control system for temporarily suspending execution of a microprocessor when a dynamic control store requires a refresh cycle.

In accordance with the present invention, a system for controlling the cycle time of a central processing unit including associated control store memory units for the storage of information is provided. The system includes a plurality of control store memory locations disposed within the control store memory units for the storage of information. The plurality of control store memory locations are operable at varying speeds and are accessible by the central processing unit. Circuitry is provided for addressing one of the plurality of control store memory locations responsive to address information contained within the information stored within the plurality of control store memory locations. The address information selects the next successive control store memory location to be accessed by the central processing unit. The system further includes logic circuitry for dynamically controlling the cycle time of the central processing unit in response to the address information and the speed of the location of the next successive one of the plurality of control store memory locations to be accessed by the central processing unit where the cycle time of the central processing unit adjusts to the speed of the next successive addressed control store memory location.

In accordance with another aspect of the present invention, a system for controlling the cycle time of a microprocessor having associated control store memory units includes a first plurality of control store memory locations operating at a first speed are provided for storage of microinstructions and are accessible by the microprocessor. A second plurality of control store memory locations operating at a second speed are provided for the storage of microinstructions and are accessible by the microprocessor. Address circuitry is provided for addressing one of the plurality of control store memory locations to address the stored microinstructions, wherein the addressed microinstructions contain information for use by the address circuitry for selecting the next successive control store memory location to be accessed by the microprocessor. The system further includes logic circuitry for dynamically controlling the cycle time of the microprocessor in response to the addressed microinstruction and the location of the next successive one of the plurality of control store memory locations to be accessed by the microprocessor wherein the cycle time of the microprocessor adjusts to the speed of the next successive addressed control store memory location.

In accordance with yet another aspect of the present invention, a system for controlling the cycle time of a microprocessor having associated control store memory units includes a plurality of static control store memory locations operating at a first speed for storing microinstructions and being accessible by the microprocessor. A plurality of dynamic control store memory locations operating at a second speed is provided for storage of microinstructions and being accessible by the microprocessor wherein the second speed is slower than the first speed of operation of the static control store memory locations. Address circuitry is provided for addressing one of the plurality of static and dynamic control store memory locations to address the stored microinstructions, where the addressed microinstructions contain information for use by the address circuitry for selecting the next successive control store memory location to be accessed by the microprocessor. The system further includes circuitry for generating clock timing signals responsive to the addressed microinstruction and the location of the next successive one of the control store memory locations to be accessed by the microprocessor. The clock timing signals are applied to the microprocessor, such that the cycle time of the microprocessor automatically adjusts to the speed of the next successive addressed control store memory location for dynamically controlling the cycle time of the microprocessor.

BRIEF DESCRIPTION OF DRAWINGS

For a more detailed description of the present invention and for further objects and advantages thereof, reference is made to the following Description, taken in conjunction with the accompanying Drawings, in which.

DESCRIPTION OF THE PREFERRED EMBODIMENT

Figure 1:
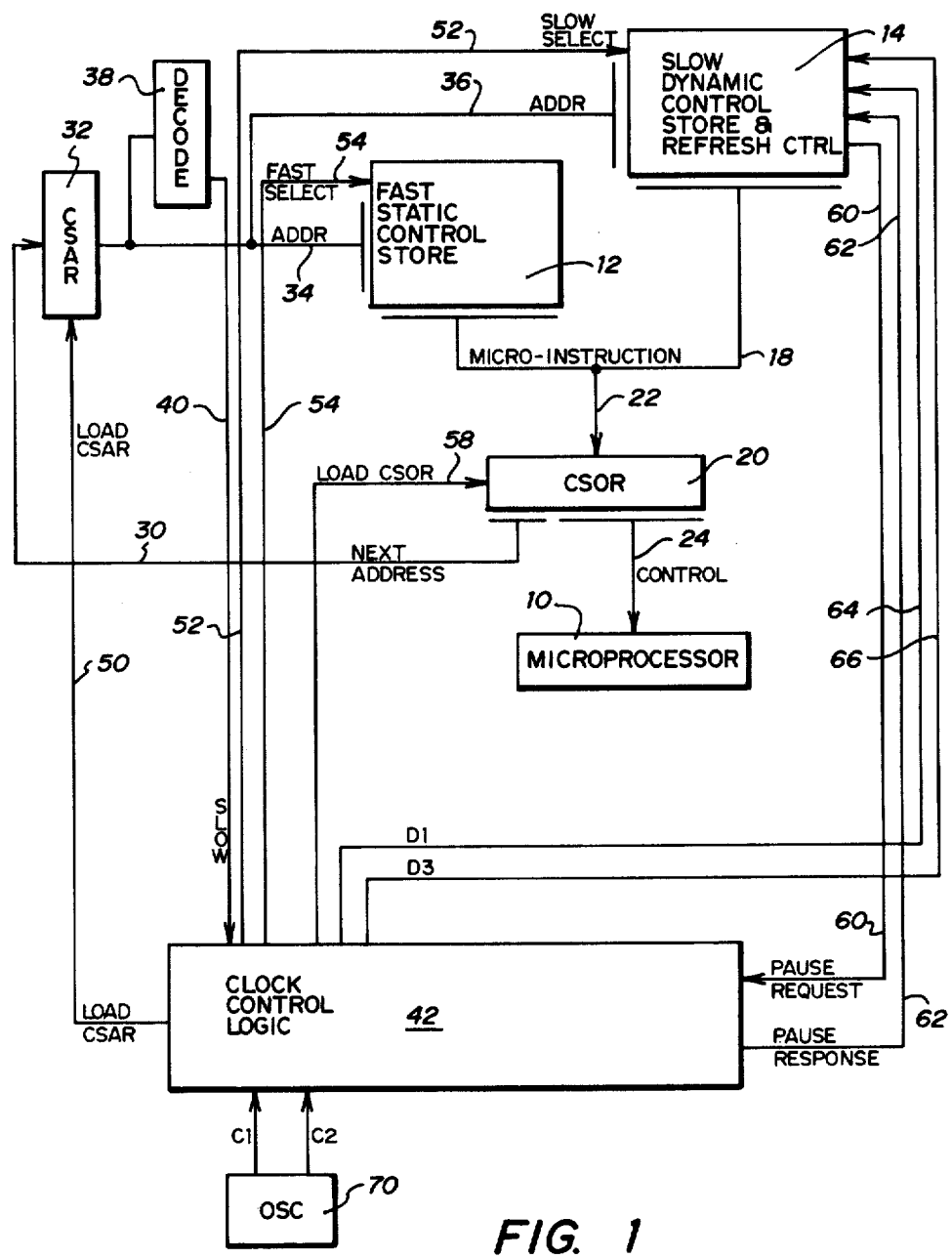
FIG. 1 is a block diagram of the present control system for a microprocessor.

Referring to FIG. 1, a microprocessor 10 and associated control store memory units 12 and 14 are illustrated. Memory unit 12 comprises a fast static control store memory and is utilized to hold the microprogram which interprets and executes the high level instructions of a user program. Memory unit 12 stores the most frequently used routines and because it is a fast static memory unit, memory unit 12 is capable of operating at the maximum speed of microprocessor 10 to provide one microinstruction for each microprocessor cycle. As used herein, a microprocessor cycle is defined as the period of time required by microprocessor 10 to execute a microinstruction and access the next microinstruction to be executed. Memory unit 12 does not require refresh cycles in contradistinction to memory unit 14 because static memory arrays are utilized.

Memory unit 14 is a slow dynamic control store memory unit and is utilized to provide a memory unit having a lower performance than memory unit 12. Memory unit 14 is composed of dynamic arrays and consequently requires periodic refresh cycles to maintain its contents. Memory unit 14 therefore includes conventional refresh control circuitry well known to those skilled in the art. This refresh control circuitry operates independent of the state of microprocessor 10. In operation, microprocessor 10 must be interlocked when refresh cycles are applied to memory unit 14. An important aspect of the present invention is the ability of the present system to control microprocessor 10 to temporarily suspend its execution of microinstructions while the refresh of memory unit 14 takes place and to automatically resume operation when refresh is completed. Memory units 12 and 14 are comprised of control store memory location registers. The number of location registers may comprise, for example, $2^{12}$ locations or $2^{13}$ locations.

Microinstructions from memory units 12 and 14 are applied to a common signal line 18 for application to a control store output register (CSOR) 20 via signal line 22. CSOR 20 generates via control signal line 24, the control pulses for controlling the cycle time of microprocessor 10. CSOR 20 holds the instruction from memory units 12 or 14 stable for one microprocessor cycle during which time the current instruction is being executed and the next instruction is being fetched for microprocessor 10. The current executing instruction contains address information for the next instruction to be executed and determines the location from either memory unit 12 or memory unit 14 from which the next instruction is to be fetched. The cycle speed of microprocessor 10 is determined by the location from which the next instruction to be executed is fetched. The cycle time of microprocessor 10 is determined by the contents of the address field contained in the current microinstruction being executed by microprocessor 10 for the next successive microinstruction to be executed. The cycle of microprocessor 10 is not determined by the microinstruction being executed nor by the speed of the memory location from which the current executing microinstruction was fetched, either memory unit 12 or 14. This technique is termed overlapped access by which the next microinstruction address is to be determined prior to complete execution of the current microinstruction.

The NEXT ADDRESS signal is output by CSOR 20 via signal line 30 to a control store address register (CSAR) 32. Control store address register (CSAR) 32 holds the address to memory units 12 and 14 stable while an access takes place. The output of CSAR 32 is applied via the ADDRESS signal line 34 to memory unit 12 and via the ADDRESS signal line 36 to memory unit 14. One or more of the high order bits of the ADDRESS signal from CSAR 32 are utilized by decode unit 38 and clock control logic 42 to determine which memory unit 12 or 14 is actually accessed.

Interconnected to CSAR 32 is a decode circuit 38 which functions to decode the high order bits depending upon the number of memory locations contained within memory units 12 and 14. The content of decode circuit 38 depends on the relative sizes of memory units 12 and 14. If, for example, there are 4096 memory locations in each memory unit 12 and 14, decode circuit 38 reduces to a single inverter. If CSAR 32 consists of 13 positions, $2^{13}$ or 8192 locations in memory units 12 and 14 can be accessed. The high order bit of CSAR 32 is used to select between the 4096 locations in memory unit 12 or the 4096 locations in memory unit 14. The low order 12 bits specify the exact address in memory units 12 or 14. An output of decode circuit 38 is applied via signal line 40 to clock control logic circuit 42.

Clock control logic circuit 42 generates and controls the clocks necessary to operate microprocessor 10 to dynamically control the cycle time of microprocessor 10. Clock control logic circuit 42 generates the LOAD CSAR signal which is applied to CSAR 32 via signal line 50. Clock control logic circuit 42 also generates the SLOW SELECT signal applied to memory unit 14 via signal line 42 and the FAST SELECT signal applied to memory unit 12 via signal line 54. Additionally, clock control logic circuit 42 generates the LOAD CSOR signal applied to CSOR 20 via signal line 58. As will be subsequently described, clock control logic circuit 42 also functions to cause suspension of execution of microinstructions by microprocessor 10 during a refresh cycle of memory unit 14.

Memory unit 14 refresh control circuit generates the PAUSE REQUEST signal applied to clock control logic circuit 42 via signal line 60. Clock control logic circuit 42 responds to memory unit 14 with the PAUSE RESPONSE signal via signal line 62. Signals D1 and D3 are also applied to memory unit 14 via signal lines 64 and 66 and are utilized by memory unit 14 in connection with the refresh cycle. This operation will be subsequently described with reference to FIG. 4.

Clock control logic circuit 42 receives SYSTEM CLOCKs C1 and C2 generated by an oscillator 70. SYSTEM CLOCKs C1 and C2 comprise a two-phase nonoverlapping clock system as is illustrated in FIGS. 3a and 3b.

Figure 2:
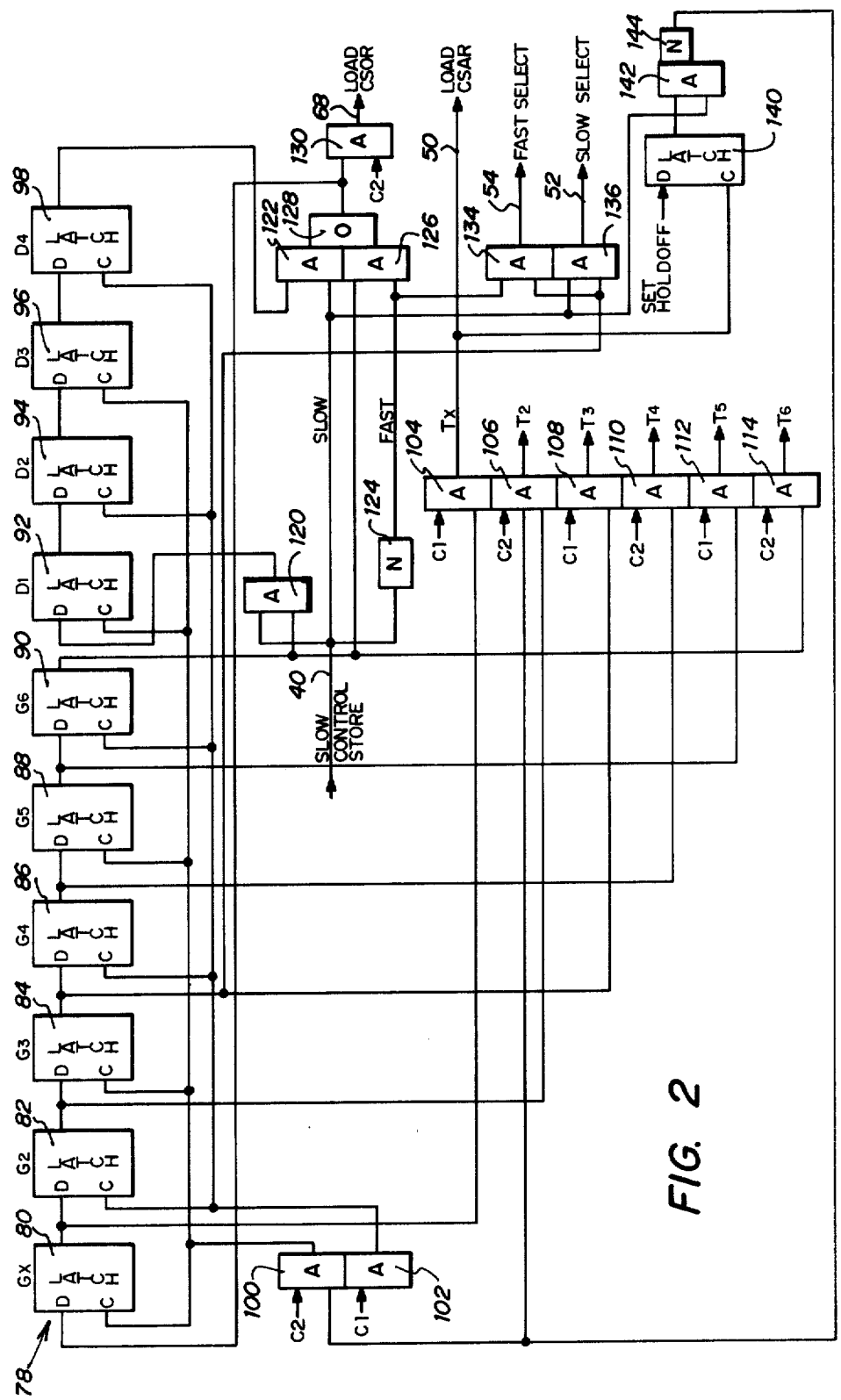
FIG. 2 is a schematic logic diagram illustrating a portion of the clock control logic circuit illustrated in the block diagram of FIG. 1.

Referring to FIG. 2, a portion of the clock control logic circuit 42 is illustrated. Clock control logic circuit 42 includes a ten position shift ring generally identified by the numeral 78. Shift ring 78 includes latches 80, 82, 84, 86, 88, 90, 92, 94, 96 and 98. The C2 CLOCK signal is applied to an AND circuit 100 for application to latches 80, 84, 88, 92 and 96. The C1 CLOCK signal is applied to an AND circuit 102 for application to latches 82, 86, 90, 94 and 98. The application of CLOCK SIGNALs C1 and C2 to latches 80-98 cause a logic 1 to propagate through shift ring 78 to generate the TX, T2, T3, T4, T5 and T6 signals which comprise the clocks for microprocessor 10 and are illustrated in FIG. 3d.

The microprocessor clocks are generated by anding the outputs of latches 80-90 with alternating C1 and C2 CLOCKs. The output of latch 80 is applied to an AND circuit 104 together with the C1 CLOCK signal to generate the TX microprocessor clock which also constitutes the LOAD CSAR signal applied via signal line 50 to CSAR 32. The output of latch 82 is applied to an AND circuit 106 which together with the C2 CLOCK signal generates the T2 microprocessor clock. The output of latch 84 is applied to an AND circuit 108 which together with the C1 CLOCK signal generates the T3 microprocessor clock. The output of latch 86 is applied to an AND circuit 110 which together with the C2 CLOCK signal generates the T4 microprocessor clock. The output of latch 88 is applied to an AND circuit 112 which together with the C1 CLOCK signal generates the T5 microprocessor clock. The output of latch 90 is applied to an AND circuit 114 which together with the C2 CLOCK generates the T6 microprocessor clock.

The SLOW CONTROL STORE signal generated by decode circuit 38 (FIG. 1) via signal line 40 is applied to an AND circuit 120 which also receives the output of latch 90. The output of AND circuit 120 is applied to the input of latch 92. The SLOW CONTROL STORE signal is also applied to an AND circuit 122 which also receives the output of latch 98. The SLOW CONTROL STORE signal is also applied through an Inverter circuit 124 for application to an AND circuit 126. The outputs of AND circuits 122 and 126 are applied to an OR circuit 128 whose output is applied to the input of latch 80. The output of OR circuit 128 is also applied to an AND circuit 130 together with the C2 CLOCK signal to generate the LOAD CSOR signal via signal line 68.

The output of Inverter circuit 124 is also applied to an AND circuit 134. The output of latch 84 is applied to AND circuit 134 and to an AND circuit 136. The output of AND circuit 134 generates the FAST SELECT signal applied to memory unit 12 via signal line 54. The SLOW CONTROL STORE signal is applied via signal line 40 to AND circuit 136 which generates the SLOW SELECT signal applied to memory unit 14 via signal line 52.

The output of AND circuit 104 is applied as a clock signal to a latch 140 which also receives the SET HOLDOFF signal. The output of latch 140 is applied to an AND circuit 142 which also receives the SLOW CONTROL STORE signal. The output of AND circuit 142 is applied to an Inverter circuit 144 whose output is applied to AND circuit 100 to block the application of the C2 CLOCK signal to latches 80, 84, 88, 92 and 96. The output of Inverter circuit 144 is also applied to AND circuit 106.

Figure 3:
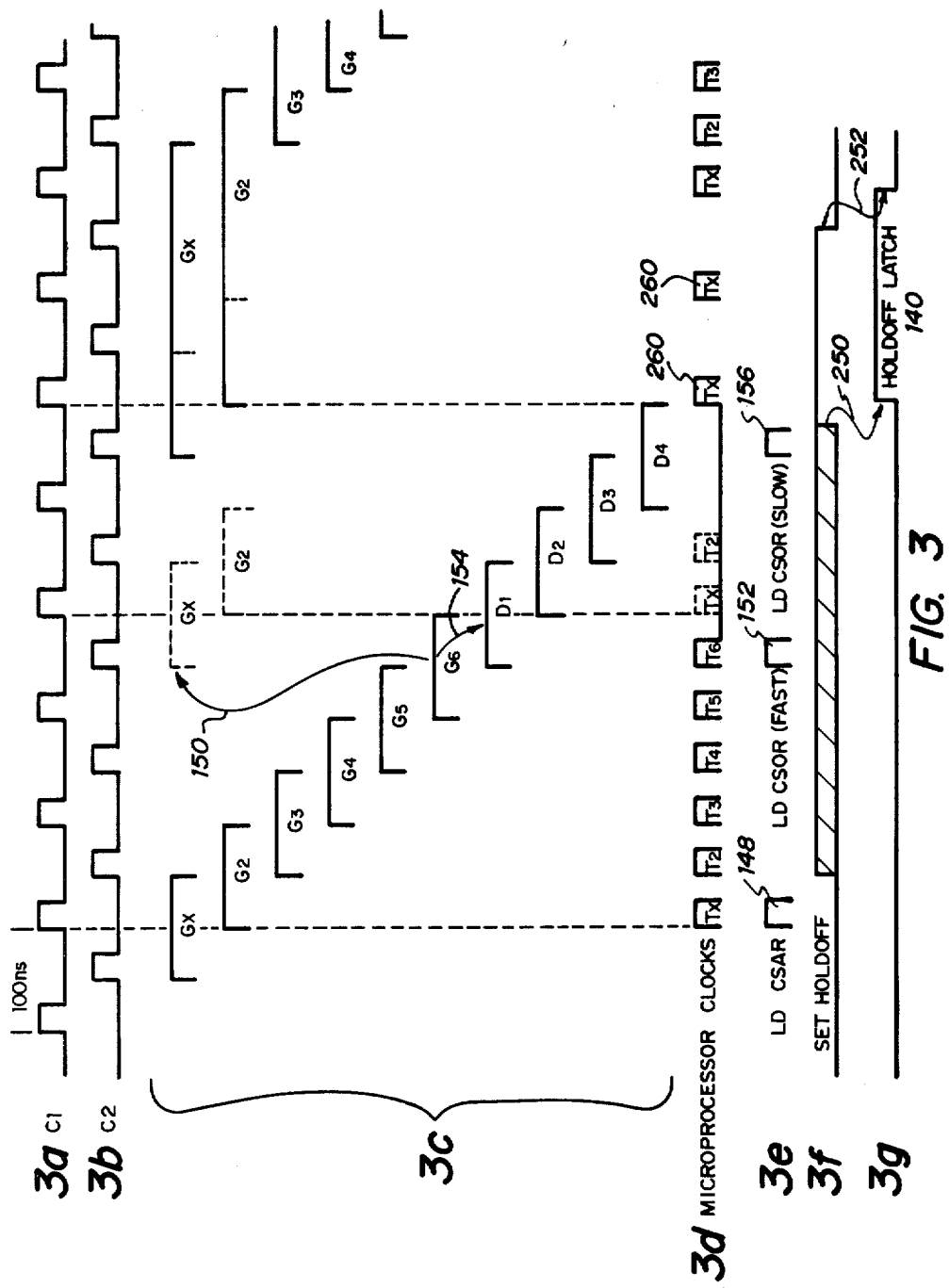
FIGS. 3a-3g are timing diagrams for the clock control logic circuit illustrated in FIG. 2.

Referring simultaneously to FIGS. 2 and 3, the generation of the clocks for microprocessor 10 will be discussed. The alternating clocking of latches 80-90 by the C1 and C2 CLOCK signals generates the GX, G2, G3, G4, G5 and G6 signals, illustrated in FIG. 3c, which are generated essentially one at a time with a slight overlap. Each latch 80-90 being gated either by C1 or C2 CLOCK signals has the ability to change in time every C1 or C2 CLOCK which in the preferred embodiment is 100 nsec. When latch 80 is clocked by a C2 CLOCK signal, the GX signal results which is anded with the C1 CLOCK signal by AND circuit 104 to generate the TX microprocessor clock (FIG. 3d). In this manner an independent set of clocks for microprocessor 10 is generated because microprocessor clocks are not generated in response to the system C1 and C2 CLOCKs, but are generated in response to the output of a latch which is clocked by the SYSTEM C1 and C2 CLOCKs.

Latches 92, 94, 96 and 98 are used to extend the microprocessor 10 cycle by adding four clocks which in the preferred embodiment adds 200 nsec. to the microprocessor cycle when operating with slow dynamic control store 14. Latches 92, 94, 96 and 98 do not generate a unique clock for microprocessor 10 but primarily are used to extend the cycle time of microprocessor 10. In operation, if fast static control store memory 12 is accessed, the output of latch 90 will generate the G6 signal and AND circuit 126 will be conditioned by the FAST signal to generate an input via OR circuit 128 to latch 80 to generate the GX signal. The GX signal is used to generate the TX microprocessor clock and the LOAD CSAR pulse indicated at 148 in FIG. 3e.

If the FAST signal is not active, then latch 80 will not be conditioned, but AND circuit 120 will apply an input to latch 92. The input to latch 92 will propagate the logic 1 through latches 94, 96 and 98 whose output will be anded by AND circuit 122 with the SLOW CONTROL STORE signal. The output of OR circuit 128 will reactivate latch 80. Therefore, CSOR 20 will be loaded by clock control logic circuit 42 during the G6 signal where the fast control store 12 is to be accessed and the propagation of the logic 1 through shift ring 78 returns to latch 80 as indicated by the arrow 150 in FIG. 3c. The LOAD CSOR pulse for access to fast control store 12 is indicated at 152 in FIG. 3e. If the SLOW CONTROL STORE signal is applied to AND circuit 120, AND circuit 120 will cause the logic 1 to be propagated through latches 92, 94, 96 and 98 to generate the D1, D2, D3 and D4 pulses indicated by arrow 154 in FIG. 3e, such that AND circuit 122 will then be conditioned during the D4 signal to generate the LOAD CSOR pulse 156 (FIG. 3e) for an access to slow control store 14.

It therefore can be seen that the output of CSAR 32 determines how long the cycle of microprocessor 10 will be since the high order bits of the address in CSAR 32 identify whether the next access is to memory unit 12 or 14 through the generation of the SLOW CONTROL STORE signal applied to clock control logic circuit 42. The SLOW CONTROL STORE signal controls the gating of latch 92, such that the logic 1 must propagate through the entire shift ring 78 before the TX microprocessor clock can be generated. Where a memory location is accessed from memory unit 14, the logic 1 propagates through shift ring 78 from latch 80 to latch 98 giving rise to a microprocessor cycle time of 500 nsec. Where a memory location is accessed from memory unit 12, the logic 1 shifts through latches 80, 82, 84, 86 and 88 and 90 of shift ring 78 giving rise to a microprocessor cycle time of 300 nsec.

This operation may be altered with each microprocessor 10 cycle if alternating microinstructions indicate that successive microinstructions are to be accessed from either memory unit 12 or 14 in succession. The cycle time of microprocessor 10 is not determined by the microinstruction being executed nor by the memory location, memory unit 12 or 14, from which the current executing microinstruction was fetched. The cycle time of microprocessor 10 is determined by the contents of the address field contained in the current executing microinstruction being executed by microprocessor 10. This address field determines the location either in the memory unit 12 or memory unit 14 for the next successive microinstruction to be executed by microprocessor 10.

Figure 4:
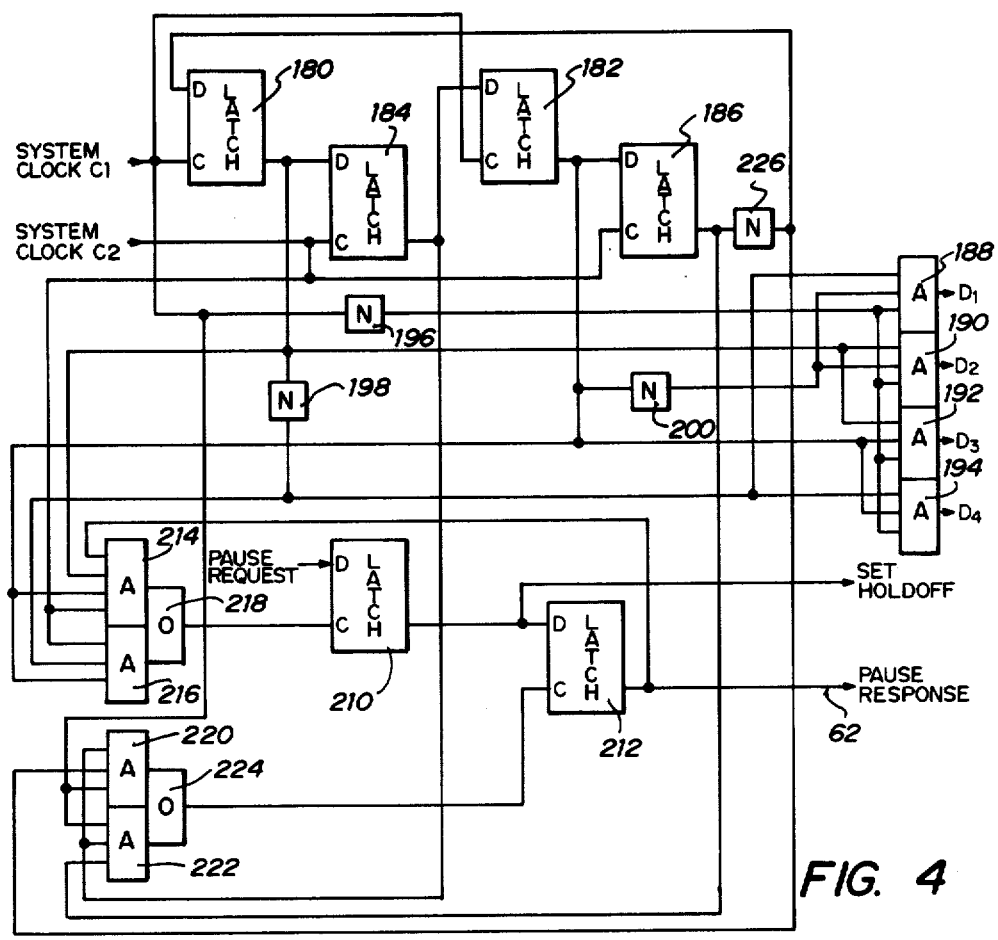
FIG. 4 is a schematic logic diagram illustrating a portion of the clock control logic circuit illustrated in the block diagram of FIG. 1.

Because memory unit 14 is a dynamic control store it requires periodic refresh of the information stored therein. During the refresh operation of memory unit 14 the processing of microinstructions by microprocessor 10 must be suspended where access of these microinstructions is required from memory unit 14 to prevent destruction of information held in memory unit 14. A further function of clock control logic circuit 42 is to suspend operation of microprocessor 10 during a refresh cycle of memory unit 14. FIG. 4 illustrates a portion of the logic circuitry of clock control logic circuit 42 utilized in connection with latch 140 (FIG. 2) for suspending operation of microprocessor 10.

Figure 6:
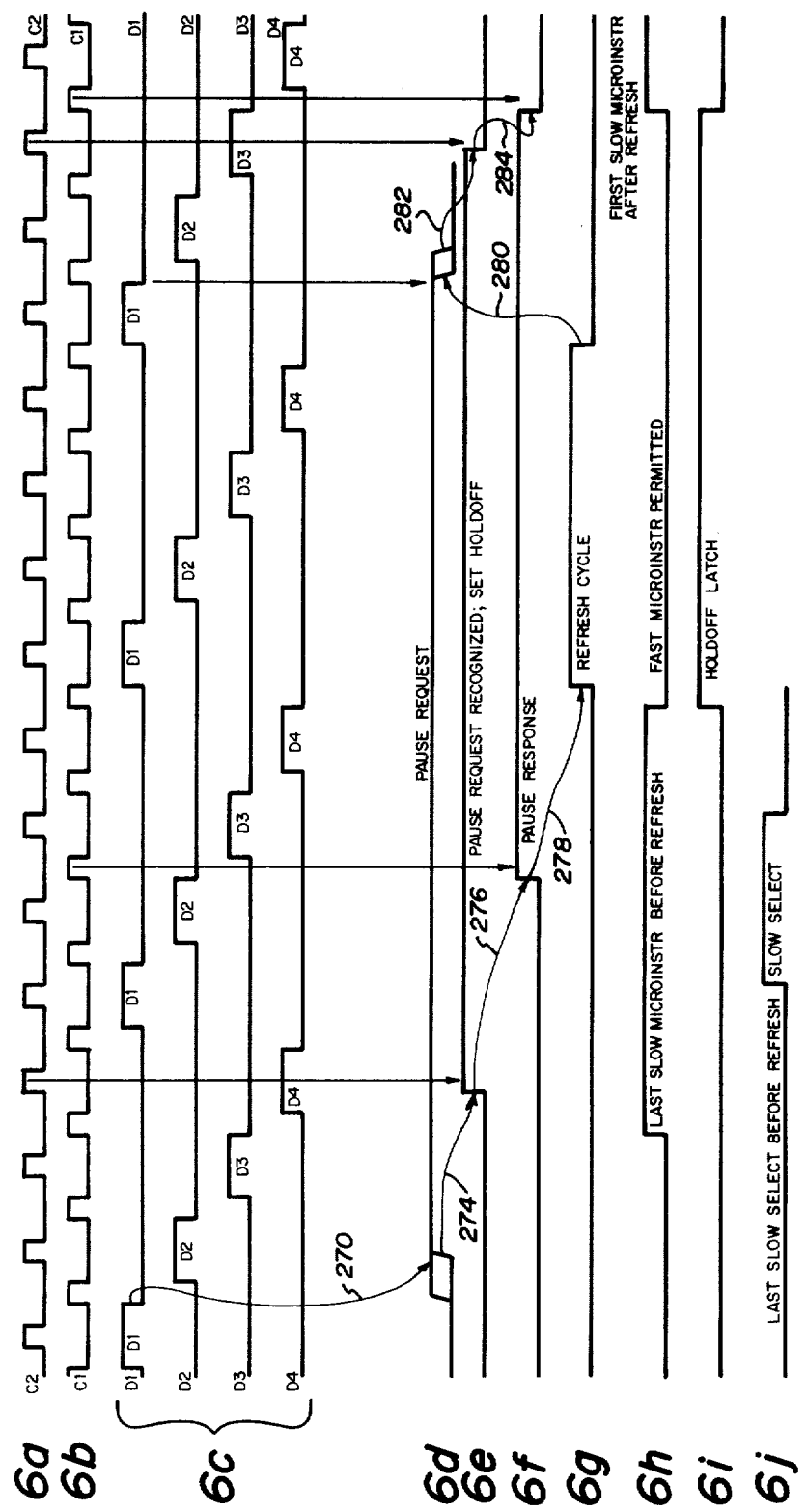
FIGS. 6a-6j are timing diagrams for the logic circuitry illustrated in FIG. 4.

Referring to FIG. 4, SYSTEM CLOCK C1 is applied to latches 180 and 182. The output of latch 180 is applied to a latch 184 which also receives as an input SYSTEM CLOCK C2. The output of latch 182 is applied to a latch 186 which also receives as an input SYSTEM CLOCK C2. Latches 180, 182, 184 and 186 function as a two-stage counter for generating four clocks D1, D2, D3 and D4 at the outputs of AND gates 188, 190, 192 and 194. Clocks D1-D4 are used in other aspects of operation of microprocessor 10 and for I/O devices. The D1-D4 clocks are illustrated in FIG. 6c and as can be seen, are wider clock pulses than the SYSTEM CLOCKs C1 and C2 (FIGS. 6a and 6b). The D1, D2, D3 and D4 clocks are wider, since typically, I/O channels interconnecting I/O devices do not require narrow pulses such as the SYSTEM CLOCKs C1 and C2. The D1 and D3 clocks are utilized in connection with the refresh control circuit of memory unit 14 and will be subsequently described with reference to FIG. 6.

FIG. 4 illustrates the generation of clocks D1-D4. SYSTEM CLOCK C1 is applied through an Inverter circuit 196 to each of AND gates 188, 190, 192 and 194. The output of latch 180 is applied through an Inverter circuit 198 to AND circuits 188 and 194. The output of latch 182 is applied through an Inverter circuit 200 to AND circuits 188 and 190. The output of latch 180 is applied to AND circuits 190 and 192. The output of latch 182 is applied to AND circuits 192 and 194.

Latches 180, 182, 184 and 186 are also utilized by clock control logic circuit 42 for generating two clock signals applied to latches 210 and 212. Latch 210 functions to generate the SET HOLDOFF signal for application to latch 140 (FIG. 2). Latch 212 functions to generate the PAUSE RESPONSE signal for application via signal line 62 to memory unit 14 (FIG. 1). The clock signal for latch 210 is generated by the operation of AND circuits 214 and 216 and an OR circuit 28. AND circuit 214 receives as inputs the output of latch 212, the output of latch 180, the output of latch 182 and the SYSTEM CLOCK C2. AND circuit 216 receives as inputs SYSTEM CLOCK C2, the output of Inverter circuit 198 and the output of latch 182.

The clock signal for latch 212 is generated by operation of AND circuits 220 and 222 and an OR circuit 224. AND circuit 220 receives as inputs the output of latch 184, the output of latch 186 through an Inverter circuit 226 and the SYSTEM CLOCK C2. AND circuit 222 receives as inputs the SYSTEM CLOCK C2, the output of latch 184 and the output of latch 186.

Because memory unit 14 is dynamic and requires a refresh of its contents, the accessing of one of its memory locations by microprocessor 10 cannot be performed simultaneously with a refresh operation. It is therefore necessary to interlock the refresh cycle of memory unit 14 to the use of memory unit 14 by microprocessor 10. This interlock mechanism is implemented by use of the PAUSE REQUEST signal, PAUSE RESPONSE signal, and SET HOLDOFF signal. Memory unit 14 raises the PAUSE REQUEST signal shortly before the refresh time of memory unit expires. The PAUSE REQUEST signal is applied to latch 210 (FIG. 4) which functions to recognize the PAUSE REQUEST signal and responds to memory unit 14 with the PAUSE RESPONSE signal generated by latch 212 (FIG. 4).

The function of latch 210 is to synchronize the operation of microprocessor 10 and the PAUSE REQUEST signal of memory unit 14. Since the refresh cycle of memory unit 14 and the execution of microinstructions by microprocessor 10 take place asynchronously, it is necessary to synchronize these two operations. Synchronization takes place using SYSTEM CLOCK C2 and latches 180 and 182 in combination with AND circuits 214 and 216 and OR circuit 218 to generate the clock signal for latch 210. The output of latch 210 generates the SET HOLDOFF signal applied to latch 140 (FIG. 2). The output of latch 212 generates the PAUSE RESPONSE signal applied to memory unit 14. Generation of the PAUSE RESPONSE signal indicates to memory unit 14 that synchronization has been completed.

Figure 5:
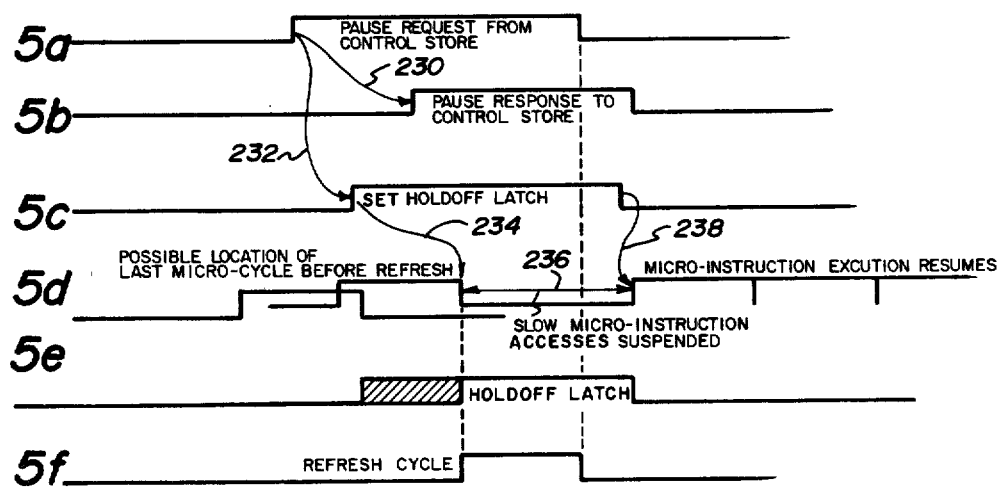
FIGS. 5a-5f are timing diagrams illustrating the operation of the holdoff latch shown in FIG. 2.

The timing diagram of FIG. 5 illustrates the above-described operations. FIG. 5a illustrates the generation of the PULSE REQUEST signal from memory unit 14. Arrow 230 indicates the generation of the PULSE RESPONSE signal to memory unit 14 in FIG. 5b and in FIG. 5c arrow 232 indicates the generation of the HOLDOFF signal and its relationship to the initiation of the PAUSE REQUEST signal. FIG. 5d illustrates possible locations of the last microinstruction before refresh is initiated. Operation of microprocessor 10 will cease at the completion of the current instruction which is indicated by arrow 234 (FIG. 5d). Arrow 236 (FIG. 5d) indicates the period of time in which the operation of microprocessor 10 is suspended for accessing microinstructions held within memory unit 14.

FIG. 5e illustrates the time in which microprocessor 10 is in holdoff and makes no accesses to memory unit 14. FIG. 5f illustrates the cycle during which refresh of memory unit 14 takes place. The refresh cycle begins shortly after the PAUSE RESPONSE signal is raised to memory unit 14 as can be seen when comparing FIGS. 5b and 5f. The PAUSE RESPONSE signal is sent to memory unit 14 independent of the actual point at which execution is suspended because microprocessor 10 may not be operating; therefore, latch 140 may not be set. When the refresh cycle is complete, memory unit 14 drops the PAUSE REQUEST signal as indicated by comparing FIGS. 5a and 5f. Thereafter, the PAUSE RESPONSE signal will be dropped (FIG. 5b) and SET HOLDOFF signal will drop (FIG. 5c) to disable latch 140 and microinstruction execution will resume as indicated at arrow 238 (FIG. 5c) illustrating the relationship between the gating of holdoff latch 140 and microinstruction execution shown in FIG. 5d.

Generation of the SET HOLDOFF signal and its application to latch 140 (FIG. 2) prohibits the application of SYSTEM CLOCK C2 to latches 80, 84, 88, 92 and 96 by operation of AND circuit 100. Blocking of C2 CLOCKs to these latches prevents the propagation of the logic 1 through shift ring 78 past latch 82 to thereby prevent the generation of microprocessor clocks T3-T6. Microprocessor clock T2 is disabled at AND circuit 106 by the holdoff latch 140 through Inverter 144. As shown in FIG. 3f, the SET HOLDOFF signal generated by latch 210 (FIG. 4) can be generated at any time during a microprocessor cycle between microprocessor clocks TX and T6 (FIG. 3d). However, the SET HOLDOFF signal will only be recognized at the start of a TX microprocessor clock as illustrated in FIG. 3f by arrow 250 when latch 140 is set. When the SET HOLDOFF signal drops, holdoff latch 140 is degated as indicated by the arrow 252 in FIG. 3g.

Because latch 140 (FIG. 1) is sampled with the first microprocessor clock, TX, of each cycle of microprocessor 10, microprocessor processing is suspended on a microinstruction boundary as illustrated in FIG. 5d. When latch 140 is reset operation of microprocessor 10 resumes where it previously stopped. Operation of holdoff latch 140 permits SYSTEM CLOCKs C1 and C2 to continue to be generated as indicated in FIGS. 6a and 6b. FIG. 6c illustrates the D1, D2, D3 and D4 clocks generated by AND circuits 188, 190, 192 and 194 of FIG. 4. FIGS. 6d-6j illustrate the relationship between the PAUSE REQUEST, PAUSE RESPONSE and refresh cycle of memory unit 14 in addition to the gating of latch 140.

Referring simultaneously to FIGS. 3 and 6, when latch 140 (FIG. 1) was set, latch 80 (FIG. 2) was gated to generate the TX microprocessor clock identified by numeral 260 of FIG. 3d. Because latch 82 is clocked with a C1 SYSTEM CLOCK and since latch 80 is set, latch 82 is also set during actuation of latch 140. The microprocessor clock T2 is not generated during actuation of holdoff latch 140. Latch 82 is degated at AND circuit 106 by the holdoff latch 140 through Inverter 144 to prevent generation of T2. It therefore can be seen that the setting of latch 140 blocks the clocks to latch 80 and blocks the shifting of the logic 1 from latch 82 to latch 84 and to all subsequent latches in shift ring 78; however, latches 80 and 82 are set.

Because latches 80 and 82 are set during actuation of latch 140, the TX microprocessor clock is generated once every two clocks instead of once every six clocks when latch 140 is reset. Shift ring 78 therefore has a cycle time of 100 nsec. instead of the 300 nsec. when the TX microprocessor clock is generated once every six clocks when latch 140 is reset. Because the cycle has been altered to run at 100 nsec. when latch 140 is actuated, microprocessor 10 can restart with a minimum delay time to resume execution of microinstructions. By altering the frequency of the TX microprocessor clock, once microprocessor 10 has been stopped, the absence of the condition which caused latch 140 to set can be determined quickly to resume the operation of microprocessor 10.

Referring again to FIG. 6, the trailing edge of the D1 pulse (FIG. 6c) generates the PAUSE REQUEST signal as indicated by arrow 270. The presence of the PAUSE REQUEST signal together with the D4 pulse (FIG. 6c) and a SYSTEM CLOCK C2 (FIG. 6a) generates the SET HOLDOFF signal indicated by arrow 274. The PAUSE RESPONSE signal is generated by SYSTEM CLOCK C1 (FIG. 6b) and is indicated at arrow 276 (FIG. 6f). The refresh cycle will begin as indicated by arrow 278 (FIG. 6g) which begins shortly after the last slow microinstruction has been executed which is shown in FIG. 6h.

During the refresh cycle as shown in FIG. 6g, fast microinstruction accessing is permitted as shown in FIG. 6h during the period in which latch 140 is set as shown in FIG. 6i. The effects of holdoff latch 140 to degate the microprocessor clocks T2-T6 are enabled at AND circuit 142 by the SLOW CONTROL STORE signal. If fast control store is being accessed, the clocks are not degated. FIG. 6j illustrates the pulse for the last SLOW SELECT signal before refresh occurs and during the execution of the last microinstruction. After refresh has been completed, the PAUSE REQUEST signal is dropped as indicated by arrow 280 (FIG. 6d). At the occurrence of the SYSTEM CLOCK C2 signal (FIG. 6a) and the next D3 clock (FIG. 6c) latch 140 is degated as indicated by the arrow 282 (FIG. 6e). At the next SYSTEM CLOCK C1 (FIG. 6b) following the D3 clock, the PAUSE RESPONSE signal is dropped as indicated by arrow 284 (FIG. 6f). The dropping of the SET HOLDOFF signal and the resetting of latch 140 (FIG. 6i) permits microprocessor 10 to again fetch microinstructions from memory unit 14 as shown in FIG. 6h. As shown in FIG. 5d and FIG. 6h, during a refresh cycle of memory unit 14, microprocessor 10 can continue to execute microinstructions fetched from memory unit 12 due to operation of the FAST SELECT signal generated during a refresh cycle.

It therefore can be seen that the present invention dynamically adjusts the cycle time of a microprocessor to adjust the microprocessor cycle to the speed of the control store being accessed by the microprocessor and temporarily suspends execution of microinstructions when accessing a control store which is slow and dynamic requiring a refresh cycle. The present control system also permits the microprocessor to respond to the asynchronous refresh request from the slow control store and further permits the main store, channel and other units associated with the microprocessor to continue to operate when microprocessor execution is suspended during refresh of the slow control store.

Whereas the present invention has been described with respect to specific embodiments thereof, it will be understood that various changes and modifications will be suggested to one skilled in the art, and it is intended to encompass such changes and modifications as fall within the scope of the appended claims.

Having thus described the invention, what is claimed as new, and desired to be secured by Letters Patent is:

1. Apparatus for controlling the cycle time of a microprocessor operable to execute instructions selectively fetched from a first control store memory unit operating in response to being addressed and receiving a select signal at a first predetermined speed and from a second control store memory unit operating in response to being addressed and receiving a select signal at a second predetermined speed the improvement comprising addressing means for addressing said first and second control store memory units for accessing said microinstructions; and logic means responsive to said addressing means for generating and applying select signals to said first and second control store memory units and for controlling the cycle time of the microprocessor at fist and second rates by generating clocking signals synchronous with said first and second predetermined speeds, the cycle time of the microprocessor being at said first rate in response to said addressing means addressing said first control store and at said second rate in response to said addressing means addressing said second control store whereby the cycle time of said microprocessor automatically adjusts to the rate that instructions are available for execution.

2. The apparatus of claim 1 wherein said second control store memory unit is characterized as having storage decay over a decay period and thereby requiring periodic refreshing;

refresh suspension logic means for refreshing said second control store at predetermined times; and logic means for temporarily suspending operation of the microprocessor during operation of said refresh logic means only when the microinstruction to be executed is from said second control store.

3. The apparatus of claim 1 wherein said addressing means includes decode means for generating at least one control signal indicating the source of the next microinstruction to be executed.

4. The apparatus of claim 1 wherein said logic means controls the cycle time of said microprocessor by controlling the time at which said microprocessor accepts the next microinstruction for execution.

5. The apparatus of claim 1 wherein said logic means determines the time when a next address is made available to said addressing means.

6. The apparatus of claim 2 wherein said microprocessor accepts the microinstruction from said second control store prior to temporary suspension of operation by said suspension logic means.

7. The apparatus of claim 2 wherein said microprocessor resumes operation after temporary suspension of operation at the time when the next address is made available to said addressing means.

* * * * *